(12) United States Patent
Sugiyama

(10) Patent No.: US 9,354,496 B2
(45) Date of Patent: May 31, 2016

(54) PROJECTOR AND LIGHT DIMMING DEVICE INCLUDING A LIGHT BLOCKING MEMBER

(71) Applicant: Seiko Epson Corporation, Tokyo (JP)

(72) Inventor: Nobuo Sugiyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 147 days.

(21) Appl. No.: 14/258,256

(22) Filed: Apr. 22, 2014

(65) Prior Publication Data

US 2014/0333905 A1    Nov. 13, 2014

(30) Foreign Application Priority Data

May 7, 2013    (JP) .................................. 2013-097390

(51) Int. Cl.
*G03B 21/20* (2006.01)
*G03B 7/00* (2014.01)
*G03B 9/02* (2006.01)
*G03B 9/24* (2006.01)

(52) U.S. Cl.
CPC .............. *G03B 21/2053* (2013.01); *G03B 7/00* (2013.01); *G03B 7/003* (2013.01); *G03B 9/02* (2013.01); *G03B 9/24* (2013.01)

(58) Field of Classification Search
CPC ...... G03B 21/2053; G03B 7/003; G03B 7/00; G03B 9/02; G03B 9/06; G03B 9/24; G03B 2207/00
See application file for complete search history.

(56) References Cited

U.S. PATENT DOCUMENTS

| 2007/0058133 A1* | 3/2007 | Totani ...................... G03B 9/06 353/20 |
| 2008/0043326 A1* | 2/2008 | Poulsen ................. G03B 21/60 359/455 |
| 2010/0231871 A1 | 9/2010 | Kitahara |

FOREIGN PATENT DOCUMENTS

| JP | 2008-122767 A | 5/2008 |
| JP | 2008-209730 A | 9/2008 |
| JP | 2010-211035 A | 9/2010 |
| JP | 2010-243976 A | 10/2010 |

* cited by examiner

*Primary Examiner* — Sultan Chowdhury
*Assistant Examiner* — Magda Cruz
(74) *Attorney, Agent, or Firm* — ALG Intellectual Property, LLC

(57) ABSTRACT

A projector includes a light source, an image forming system adapted to form an image using light from the light source, a projection system adapted to project the image formed by the image forming system, and a dimming device including a light-blocking member adapted to move into and out of a light path between an exit end surface of the projection system and the light source, and adapted to control an intensity of the light emitted from the light source. The light-blocking member includes a first movable section having at least one light-transmitting section and a light-blocking section, and a second movable section adapted to block the light passed through the light-transmitting section. At least one radiator plate is provided to either one or both of the first movable section and the second movable section.

8 Claims, 10 Drawing Sheets

PROJECTOR AND LIGHT DIMMING DEVICE INCLUDING A LIGHT BLOCKING MEMBER

BACKGROUND

1. Technical Field

The present invention relates to a projector.

2. Related Art

In the past, there has been known a projector as one of display devices. The projector modulates light from, for example, an illumination device with a light modulation device to thereby form an image, and then projects the image on a screen with a projection lens and so on. In the projector, there has been proposed a technology for controlling the intensity of the light emitted from a light source with a dimming device in order to improve the contrast of the image (see, e.g., JP-A-2010-243976 (Document 1), JP-A-2010-211035 (Document 2)).

In the projectors of Document 1 and Document 2, the dimming device is provided with a light-blocking member capable of blocking at least apart of the light from the light source. The light-blocking member moves into and out from a light path between the light source and the light modulation device. The intensity of the light blocked by the light-blocking member among the light from the light source varies in accordance with the position of the light-blocking member, and as a result, the intensity of the light entering the light modulation device can be controlled.

In general, the light-blocking member of the dimming device rises in temperature when receiving the light from the light source. When the light-blocking member is heated to a high temperature, the light-blocking member or a peripheral member is deformed or melted to be deteriorated due to the heat in some cases. As a result, the life of the projector might be shortened.

SUMMARY

An advantage of some aspects of the invention is to provide a projector capable of inhibit the life from being shortened.

A projector according to a first aspect of the invention includes a light source, an image forming system adapted to form an image using light from the light source, a projection system adapted to project the image formed by the image forming system, and a dimming device including a light-blocking member adapted to move into and out of a light path between an exit end surface of the projection system and the light source, and adapted to control an intensity of the light emitted from the light source, the light-blocking member includes a first movable section having at least one light-transmitting section and a light-blocking section, and a second movable section adapted to block the light passed through the light-transmitting section, and at least one radiator plate is provided to either one or both of the first movable section and the second movable section.

In this projector, since the first movable section and the second movable section are made to share the role of blocking the light to be blocked by the light-blocking member out of the light from the light source, and at the same time, the radiator plate provided to either one or both of the first movable section and the second movable section releases the heat of the light-blocking member, the rise in temperature of the light-blocking member can be suppressed. Therefore, the light-blocking member or the peripheral members are inhibited from being deteriorated due to the heat caused by the light from the light source, and thus the life of the projector can be inhibited from being shortened.

In the projector according to the first aspect of the invention, the first moving section may be provided with the radiator plate formed by cut and bend, and the light-transmitting section may include an opening formed by the cut and bend.

In this projector, since the opening of the light-transmitting section is formed at the same time as the radiator plate is formed, the manufacturing cost can be suppressed.

In the projector according to the first aspect of the invention, the second movable section may have a tilted surface at which the light passed through the light-transmitting section enters, and the radiator plate of the first movable section guides the light, which has been reflected by the tilted surface of the second movable section, to the light-blocking section.

In this projector, the light having been reflected by the tilted surface of the second movable section can be inhibited from becoming stray light, and the rise in temperature and so on of the constituents of the projector caused by receiving the stray light can be inhibited. Therefore, the deterioration of the constituents receiving the stray light due to the rise in temperature is inhibited, and thus, the life of the projector can be inhibited from being shortened.

A projector according to a second aspect of the invention includes a light source, an image forming system adapted to form an image using light from the light source, a projection system adapted to project the image formed by the image forming system, and a dimming device including a light-blocking member adapted to move into and out of a light path between an exit end surface of the projection system and the light source, and adapted to control an intensity of the light emitted from the light source, and the light-blocking member includes a first movable section having at least one light-transmitting section and a light-blocking section, and a second movable section having a tilted surface at which the light passed through the light-transmitting section enters, and adapted to guide a part of the light passed through the light-transmitting section to the light-blocking section due to reflection by the tilted surface.

In this projector, the light having been reflected by the tilted surface of the second movable section can be inhibited from becoming stray light, and the rise in temperature and so on of the constituents of the projector caused by receiving the stray light can be inhibited. Therefore, the deterioration of the constituents receiving the stray light due to the rise in temperature is inhibited, and thus, the life of the projector can be inhibited from being shortened.

In the projector according to the first or second aspect of the invention, in the first movable section, a density of a distribution of the light-transmitting sections may increase in a direction from an area where an intensity of the light from the light source is relatively low toward an area where the intensity is relatively high.

In this projector, in the area of the first movable section where the intensity of the light from the light source is relatively high, the intensity of the light passing through the first movable section increases to a relatively high level. Therefore, since the local rise in temperature of the first movable section is suppressed to thereby suppress the deterioration of the first movable section due to the heat, the life of the projector can be inhibited from being shortened.

A projector according to a third aspect of the invention includes a light source, an image forming system adapted to form an image using light from the light source, a projection system adapted to project the image formed by the image forming system, and a dimming device including a light-blocking member adapted to move into and out of a light path between an exit end surface of the projection system and the light source, and adapted to control an intensity of light to be emitted from the projection system, the light-blocking member includes a first movable section having at least one light-transmitting section and a light-blocking section, and a second movable section adapted to block the light passed through the light-transmitting section, and in the first movable section, a density of a distribution of the light-transmitting sections increases in a direction from an area where an intensity of the light from the light source is relatively low toward an area where the intensity is relatively high.

In this projector, in the area of the first movable section where the intensity of the light from the light source is relatively high, the intensity of the light passing through the first movable section increases to a relatively high level. Therefore, since the local rise in temperature of the first movable section is suppressed to thereby suppress the deterioration of the first movable section due to the heat, the life of the projector can be inhibited from being shortened.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
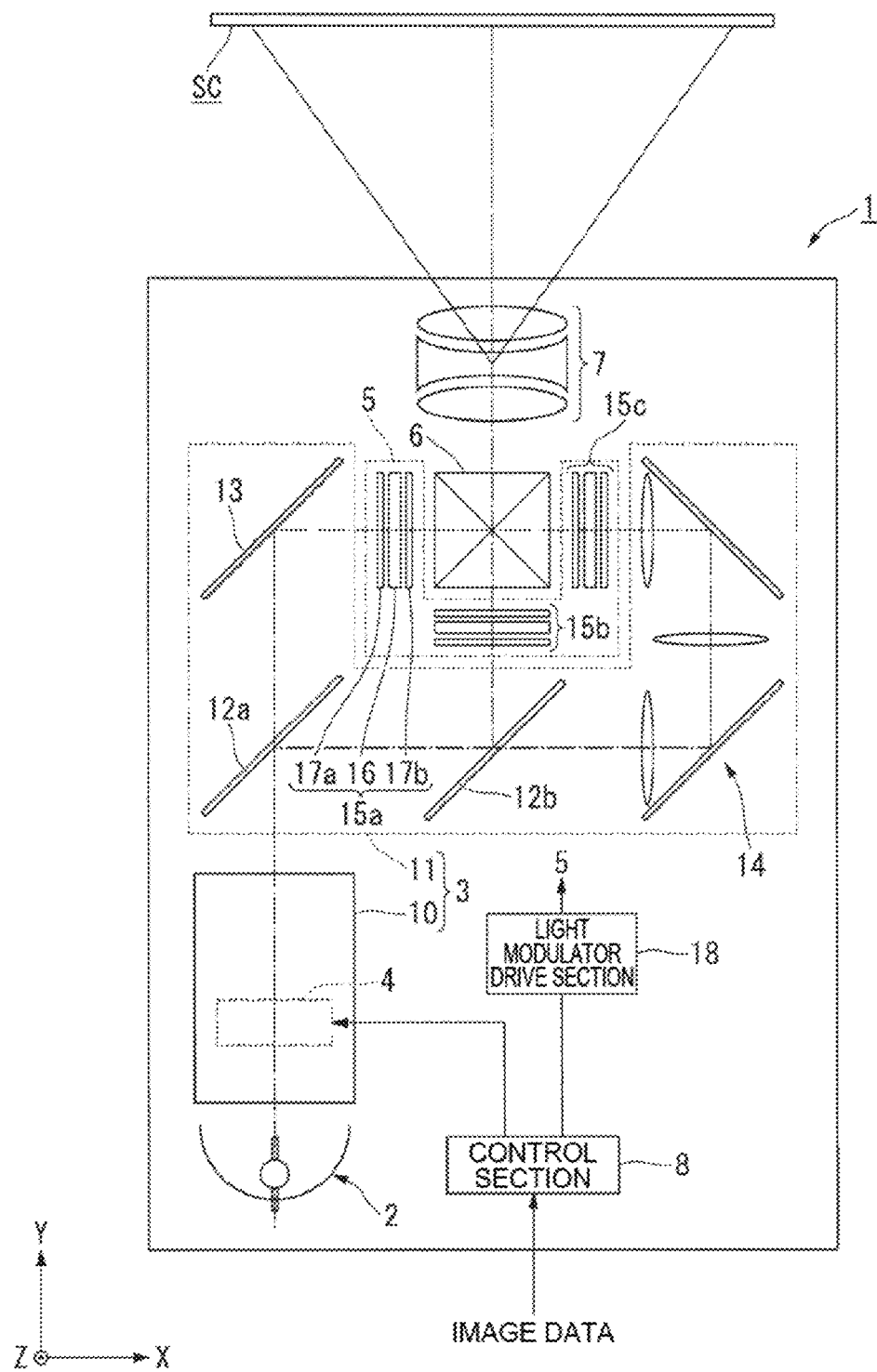
FIG. 1 is a diagram showing a projector according to a first embodiment of the invention.

A first embodiment will be explained. FIG. 1 is a diagram showing a projector 1 according to the present embodiment. The projector 1 forms an image in accordance with image data supplied from a signal source such as a DVD player or a PC, and then projects the image thus formed on a projection surface SC (a display screen) such as a screen or a wall.

The projector 1 according to the present embodiment is a so-called three-panel projector. The projector 1 can express a full-color image by forming images of respective colors and then spatially superimposing the images of the respective colors, or projecting the images of the three colors in a time sequential manner at a refresh rate so high that the viewer fails to distinguish the images of the respective colors.

The projector 1 shown in FIG. 1 is provided with a light source 2, an illumination optical system 3, a dimming device 4, an image forming system 5, a dichroic prism 6, a projection system 7, and a control section 8.

The light source 2 includes a lamp light source such as an ultra-high pressure mercury lamp (UHP), or a solid-state light source such as an LED, and emits the source light (e.g., white light) including the wavelength band of red, green, and blue. The illumination optical system 3 illuminates the image forming system 5 (an illumination area) with the source light from the light source 2.

The illumination optical system 3 is provided with a uniformizing optical system 10 for uniformizing the illuminance distribution in the illumination area, and a color separation optical system 11 for performing the color separation of the light passing through the uniformizing optical system 10. The dimming device 4 is partially disposed in the light path of the uniformizing optical system 10 to control the intensity of the source light passing through the uniformizing optical system 10. In other words, the dimming device 4 controls the intensity of the source light which reaches the image forming system 5. The uniformizing optical system 10 and the dimming device 4 will be explained later in detail.

The color separation optical system 11 is provided with a dichroic mirror 12a, a dichroic mirror 12b, a bending mirror 13, and a relay optical system 14. The dichroic mirror 12a has a property of transmitting the red light, and reflecting the green light and the blue light. The dichroic mirror 12b has a property of reflecting the green light, and transmitting the blue light.

The red light among the source light from the uniformizing optical system 10 passes through the dichroic mirror 12a, and is then reflected by the bending mirror 13, and then enters the image forming system 5. The green light among the source light from the uniformizing optical system 10 is reflected by the dichroic mirror 12a, then reflected by the dichroic mirror 12b, and then enters the image forming system 5. The blue light among the source light from the uniformizing optical system 10 is reflected by the dichroic mirror 12a, then passes through the dichroic mirror 12b, and then enters the image forming system 5 through the relay optical system 14. In the light path between the relay optical system 14 and the dichroic mirror 12b, a plane (a plane conjugate with the red and green illumination areas) where the illuminance is roughly uniform is formed by the uniformizing optical system 10, and the relay optical system 14 makes the plane and the blue illumination area conjugate with each other. As described above, the color separation optical system 11 also functions as a light guide section for guiding each of the colored light beams obtained by the separation to the image forming system 5 besides the function of separating the colored light beams from each other.

The image forming system 5 includes an image forming device 15a, an image forming device 15b, and an image forming device 15c for forming the images of the respective colors. Here, for the sake of convenience of explanation, it is assumed that the image forming device 15a forms the red image, the image forming device 15b forms the green image, and the image forming device 15c forms the blue image, respectively.

The image forming device 15a includes, for example, a normally-black liquid crystal light valve, and emits the light (hereinafter referred to as image light) representing the image formed. In the present embodiment, the image forming device 15a includes a transmissive liquid crystal panel 16, a polarization plate 17a disposed on the entrance side of the liquid crystal panel 16, and a polarization plate 17b disposed on the exit side of the liquid crystal panel 16.

The polarization plate 17a on the entrance side transmits first linearly polarized light and at the same time blocks second linearly polarized light. The liquid crystal panel 16 is driven by a light modulator drive section 18 (a driver), and modulates the red light, which has entered from the color separation optical system 11, in accordance with the image data. The polarization plate 17b on the exit side is disposed in, for example, an orientation in which the transmission axis thereof is perpendicular to the transmission axis of the polarization plate 17a on the entrance side, and transmits the second linearly polarized light and at the same time blocks the first linearly polarized light.

The control section 8 controls the light modulator drive section 18 (the driver) based on the image data to thereby control the polarization state of the light passed through the liquid crystal panel 16, and thus, controls a pattern of the light passing through the polarization plate 17b on the exit side. In such a manner as described above, the control section 8 makes the image forming device 15a form the image defined by the image data. In the image forming device 15a, the red light representing the red image enters the dichroic prism 6.

The image forming device 15b and the image forming device 15c each have the same configuration as that of the image forming device 15a, and the redundant explanation with that of the image forming device 15a will be omitted. The green light representing the green image formed by the image forming device 15b and the blue light representing the blue image formed by the image forming device 15c each enter the dichroic prism 6.

The dichroic prism 6 is apart of light guide section for guiding the image light, which has been emitted from the image forming system 5, to the projection system 7. The dichroic prism 6 includes a first wavelength separation film and a second wavelength separation film each having a property of reflecting or transmitting the incident light depending on the wavelength of the incident light. The first wavelength separation film and the second wavelength separation film are disposed so as to be perpendicular to each other. The first wavelength separation film has a property of transmitting the blue light and the green light, and at the same time reflecting the red light. The second wavelength separation film has a property of transmitting the green light and the red light, and at the same time reflecting the blue light.

The colored light beams having entered the dichroic prism 6 from the image forming system 5 are emitted from the dichroic prism 6 with the proceeding directions aligned with each other due to the reflection or the transmission in the first wavelength separation film and the second wavelength separation film. For example, in the case in which the red image, the green image, and the blue image are formed at roughly the same time in the image forming system 5, the dichroic prism 6 functions as a color combining section for combining these images of the three colors. The image light emitted from the dichroic prism 6 enters the projection system 7.

The projection system 7 is a so-called projection lens, and projects the image formed by the image forming system 5. The projection system 7 forms an image surface optically conjugate with a surface (a substance surface) on which the image is formed in the image forming system 5. By disposing the projection surface SC at the position or the vicinity of this image surface, an in-focus image is displayed on the projection surface SC.

Figure 2:
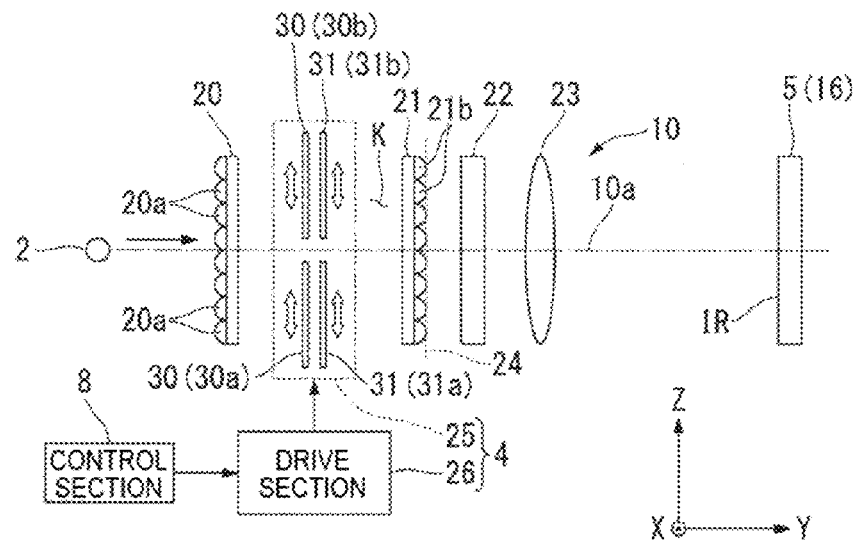
FIG. 2 is a diagram showing a uniformizing optical system and a dimming device in the embodiment.

Then, the uniformizing optical system 10 and the dimming device 4 will be explained. FIG. 2 is a diagram showing the uniformizing optical system 10 and the dimming device 4 in the present embodiment. The uniformizing optical system 10 shown in FIG. 2 includes a fly-eye lens 20, a fly-eye lens 21, a polarization conversion element 22, and an superimposing lens 23.

The fly-eye lens 20 includes a plurality of lens elements 20a arranged two-dimensionally on a predetermined surface. The source light from the light source 2 enters the plurality of lens elements 20a in a divided manner. In other words, the plurality of lens elements 20a divides the source light from the light source 2 into a plurality of partial light beams. Each of the plurality of lens elements 20a forms a plane (hereinafter referred to as a first conjugate plane 24) optically conjugate with the light source 2. In other words, each of the lens elements 20a forms a light source image (a secondary light source) on the first conjugate plane 24.

The fly-eye lens 21 includes a plurality of lens elements 21b arranged two-dimensionally. The surface on which the lens elements 21b are arranged is disposed at the position or in the vicinity of the first conjugate plane 24 formed of the fly-eye lens 20. On each of the lens elements 21b of the fly-eye lens 21, there is formed a light source image, and an emission pattern including the plurality of light source images is formed on the fly-eye lens 21 (the first conjugate plane 24).

The superimposing lens 23 overlaps the light beams emitted from the respective lens elements 21b of the fly-eye lens 21 on roughly the same areas (the illumination area IR on the image forming system 5). The superimposing lens 23 includes one or more lenses each rotationally symmetric around a predetermined axis such as a spherical lens or an aspherical lens. The predetermined axis corresponds to an optical axis (an optical axis 10a of the uniformizing optical system 10) of the superimposing lens 23, and is roughly perpendicular to the first conjugate plane 24 formed of the fly-eye lens 20.

The dimming device 4 is provided with a light-blocking member 25 and a drive section 26. The light-blocking member 25 shown in FIG. 2 can be disposed in alight path K between the fly-eye lens 20 and the fly-eye lens 21, and can move into and out from the light path K. The drive section 26 includes an actuator such as an electric motor, and moves the light-blocking member 25 with an amount of movement corresponding to the control signal from the control section 8.

When at least a part of the light-blocking member 25 is disposed inside the light path K, the light-blocking member 25 blocks at least a part of the source light. In the light-blocking member 25 disposed inside the light path K, at least a part of a light receiving section to which the source light is input blocks the source light by reflecting or absorbing the source light. The light receiving section is formed of a metal material such as aluminum or chromium, and the reflectance and the absorptance with respect to the source light can be controlled using an alumite treatment, blackening, and so on. The light-blocking member 25 includes a first movable section 30 and a second movable section 31.

The first movable section 30 shown in FIG. 2 has a roughly plate-like shape, and extends in a direction intersecting with (perpendicular to) the optical axis 10a of the uniformizing optical system 10. The first movable section 30 moves in a plane intersecting with (perpendicular to) the optical axis 10a of the uniformizing optical system 10. The first movable section 30 includes a movable element 30a and a movable element 30b. The movable element 30a and the movable element 30b are disposed at positions across the optical axis 10a of the uniformizing optical system 10, and moves in the directions of getting closer to each other and the directions of getting away from each other.

The second movable section 31 is disposed on the opposite side of the light source 2 to the first movable section 30. The second movable section 31 has a roughly plate-like shape, and moves in a plane intersecting with (perpendicular to) the optical axis 10a of the uniformizing optical system 10. In the present embodiment, the second movable section 31 moves in conjunction with the first movable section 30. The second movable section 31 can be disposed at a position at which the second movable section 31 overlaps the first movable section 30 when viewed from the direction of the optical axis 10a of the uniformizing optical system 10 in the light path K. The second movable section 31 includes a movable element 31a and a movable element 31b. The movable element 31a and the movable element 31b are disposed at positions across the optical axis 10a of the uniformizing optical system 10, and moves in the directions of getting closer to each other and the directions of getting away from each other.

The movable element 31a of the second movable section 31 and the movable element 30a of the first movable section 30 form a pair, and the movable element 31a moves in conjunction with the movable element 30a of the first movable section 30. The movable element 31a of the second movable section 31 can be disposed at a position at which the movable element 31a overlaps the movable element 30a of the first movable section 30 when viewed from the direction of the optical axis 10a of the uniformizing optical system 10. The movable element 31b of the second movable section 31 and the movable element 30b of the first movable section 30 form a pair, and the movable element 31b moves in conjunction with the movable element 30b. The positional relationship between the movable element 31b and the movable element 30b is substantially the same as the relationship between the movable element 31a and the movable element 30a.

Figure 3:
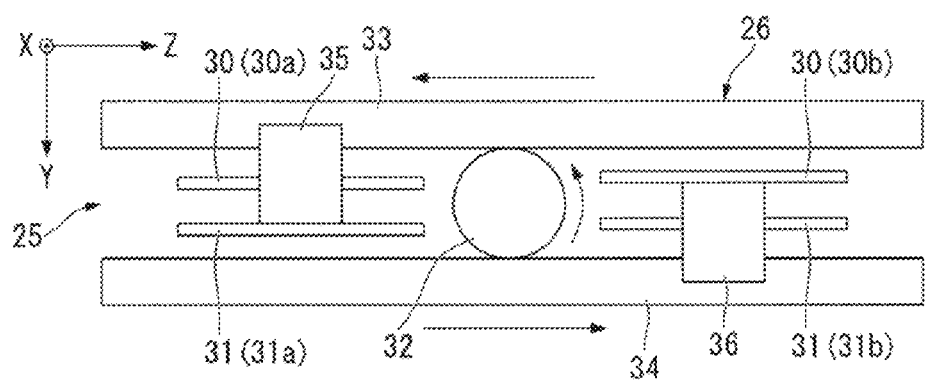
FIG. 3 is a diagram showing an example of a light-blocking member and a drive section.

FIG. 3 is a diagram showing an example of the light-blocking member 25 and the drive section 26. The drive section 26 includes a driven gear 32 connected to an actuator, a rack gear 33 and a rack gear 34 connected to the driven gear 32, a support member 35 fixed to the rack gear 33, and a support member 36 fixed to the rack gear 34. The movable element 30a of the first movable section 30 and the movable element 31a of the second movable section 31 are attached to the support member 35. The movable element 30b of the first movable section 30 and the movable element 31b of the second movable section 31 are attached to the support member 36.

The driven gear 32 of the drive section 26 rotates due to the torque supplied from the actuator. When the driven gear 32 rotates, the rack gear 33 is translated in a direction perpendicular to the optical axis 10a (see FIG. 2) of the uniformizing optical system 10, and the support member 35, the movable element 30a, and the movable element 31a are also translated due to the translation of the rack gear 33. Further, when the driven gear 32 rotates, the rack gear 34 is translated in a direction opposite to the direction of the rack gear 33. The support member 36, the movable element 30b, and the movable element 31b are also translated due to the translation of the rack gear 34. In such a manner as described above, the movable element 30b and the movable element 31b attached to the support member 36 are translated in the opposite direction to the direction of the movable element 30a and the movable element 31a attached to the support member 35.

Figures 4A, 4B, 4C:
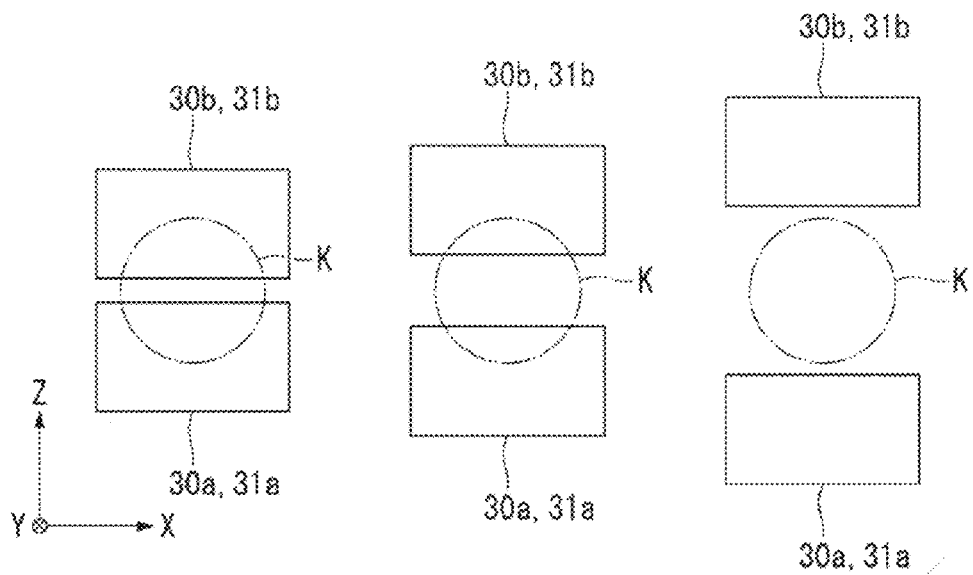
FIGS. 4A through 4C are diagrams showing an action of the light-blocking member.

FIGS. 4A through 4C are diagrams showing an action of the light-blocking member 25. Although FIGS. 4A through 4C show the movable element 30a and the movable element 30b of the first movable section 30 among the constituents of the light-blocking member 25, as described above, the movable element 31a of the second movable section 31 overlaps the movable element 30a of the first movable section 30, and the movable element 31b of the second movable section 31 overlaps the movable element 30b of the first movable section 30.

In FIG. 4A, the movable element 30a and the movable element 30b of the first movable section 30 are close to each other, and can block most of the source light passing through the light path K except the central part. It should be noted that the movable element 30a and the movable element 30b of the first movable section 30 can be moved to the positions where the movable element 30a and the movable element 30b have contact with each other, or the vicinities of the positions.

In FIG. 4B, the movable element 30a and the movable element 30b of the first movable section 30 are disposed at positions farther from each other than in the case shown in FIG. 4A, and the area overlapping the light path K is smaller than in the state shown in FIG. 4A. Therefore, the intensity of the source light passing through the dimming device 4 in the state shown in FIG. 4B is higher than in the state shown in FIG. 4A.

It should be noted that as shown in FIGS. 4A and 4B, when the movable element 30a moves in the direction of getting closer to the optical axis 10a of the uniformizing optical system 10, the movable element 31a moves in the direction of getting closer to the optical axis 10a of the uniformizing optical system 10. Similarly, when the movable element 30a moves in the direction of getting away from the optical axis 10a of the uniformizing optical system 10, the movable element 31a moves in the direction of getting away from the optical axis of the uniformizing optical system 10. The same applies to the positional relationship between the movable element 31b and the movable element 30b.

In FIG. 4C, the movable element 30a and the movable element 30b of the first movable section 30 are disposed at positions farther from each other than in the case shown in FIG. 4B, and fail to overlap the light path K. Therefore, the intensity of the source light passing through the dimming device 4 in the state shown in FIG. 4C is higher than in the state shown in FIG. 4B, and is maximized.

As shown in FIGS. 4A through 4C, in the dimming device 4, the amount of the source light to be blocked varies in accordance with the change in the positions of the first movable section 30 and the second movable section 31 with respect to the light path K. As a result, the intensity of the source light emitted from the uniformizing optical system 10 varies to thereby vary the intensity of the source light reaching the image forming system 5.

The control section 8 shown in FIG. 2 controls the drive section 26 based on the image data to control the position (see FIG. 3) of the light-blocking member 25 with respect to the light path K to thereby control the intensity of the light passing through the dimming device 4 out of the source light. For example, the control section 8 determines the luminance of the image based on the frequency distribution of the grayscales of the pixels in the image in each of the frames, and then controls the drive section 26 so as to increase the light-blocking amount by the dimming device 4 in the case in which, for example, the luminance of the image is lower (darker) than a threshold value. As a result, the light leakage and so on in the image forming system 5 (the liquid crystal light valves) can be reduced, and thus, the degradation of the contrast can be suppressed.

Incidentally, the light-blocking member of the dimming device generally rises in temperature when receiving the light from the light source. When the light-blocking member is heated to a high temperature, the light-blocking member or a peripheral member is deformed or melted to be deteriorated due to the heat in some cases. As a result, it is possible that the life of the projector is shortened, or the frequency of the maintenance increases. Although it is also possible to reduce the light-blocking amount by the dimming device in the case in which the temperature of the light-blocking member rises to a level higher than the threshold value as a measure for such a problem, in this case, it is possible that the degradation of the contrast fails to be suppressed.

The projector 1 according to the present embodiment can suppress the rise in temperature of the light-blocking member 25 of the dimming device 4, and can therefore avoid such a problem as described above. The light-blocking member 25 will be explained hereinafter in more detail.

Figure 5:
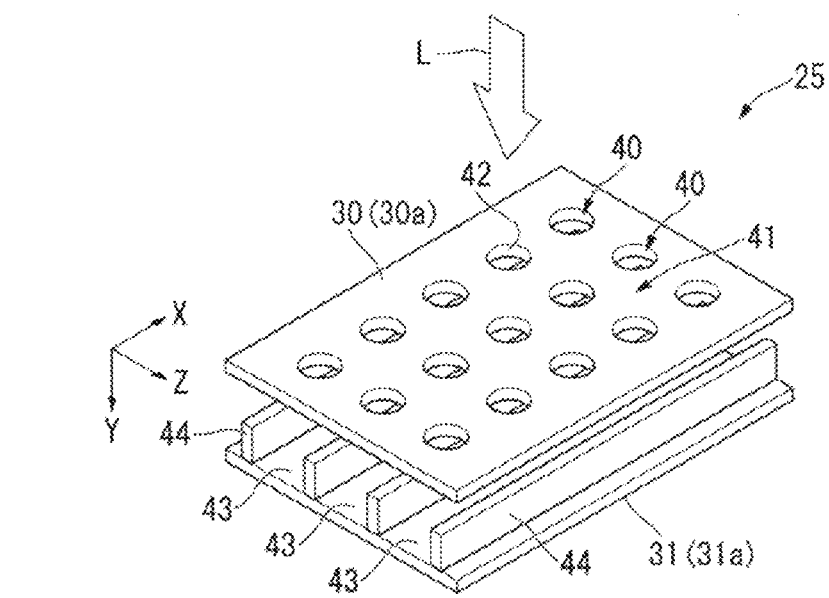
FIG. 5 is a perspective view showing the light-blocking member.
Figure 6A:
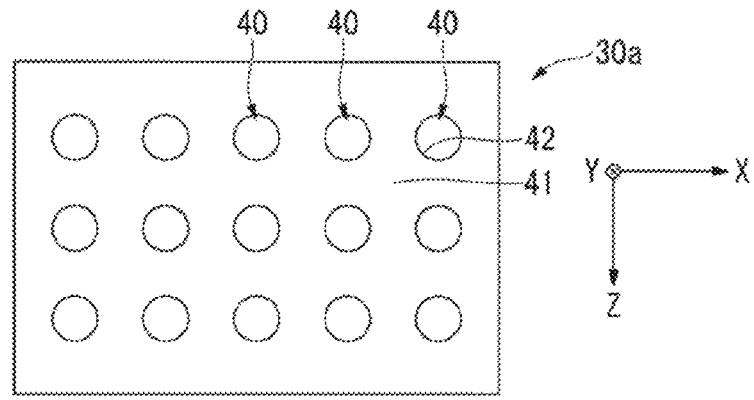
FIG. 6A is a plan view showing a first movable section.
Figure 6B:
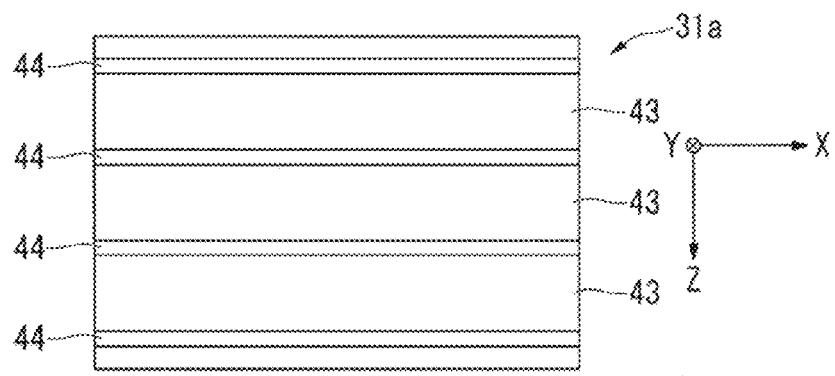
FIG. 6B is a plan view showing a second movable section.
Figure 7:
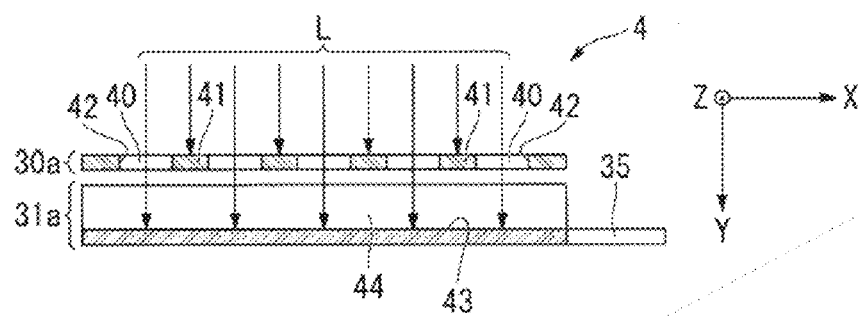
FIG. 7 is a side view showing the light-blocking member.

FIG. 5 is a perspective view showing the light-blocking member 25, FIG. 6A is a plan view showing the first movable section 30, FIG. 6B is a plan view showing the second movable section 31, and FIG. 7 is a side view showing the light-blocking member 25. It should be noted that the movable element 30b of the first movable section 30 shown in FIG. 2 has substantially the same configuration as that of the movable element 30a, and the movable element 31b of the second movable section 31 has substantially the same configuration as that of the movable element 31a. Therefore, the movable element 30b and the movable element 31b are omitted from the drawing in FIGS. 5 through 7.

As shown in FIGS. 5 through 7, the movable element 30a of the first movable section 30 has light-transmitting sections 40 for transmitting the source light L from the light source and a light-blocking section 41 for blocking the source light L. The movable element 30a shown in FIG. 5 includes a plate-like member provided with openings 42. The light-transmitting sections 40 each include the opening 42, and the light-blocking section 41 includes the other part of the plate-like member than the openings 42. Although in the present embodiment, the inside of the opening 42 is a space, it is also possible to dispose a light transmissive member inside the opening 42.

The movable element 31a of the second movable section 31 is a plate-like member, and is disposed so as to overlap the movable element 30a. The movable element 31a has a light-receiving surface 43 opposed to the movable element 30a. The source light L passed through the opening 42 enters a part of the light-receiving surface 43 of the movable element 31a, and is blocked by the light-receiving surface 43. The light-receiving surface 43 is provided with radiator plates 44 each having a fin-like shape. The radiator plates 44 project from the light-receiving surface 43 toward the movable element 30a.

The radiator plates 44 are each formed of, for example, a metal material, and are bonded to the light-receiving surface 43 using either one of various bonding methods such as welding, rivet connection, or screw fixation.

The radiator plates 44 are disposed at, for example, positions where the source light L passed through the openings 42 of the movable element 30a is not input. In other words, the radiator plates 44 are disposed at positions not overlapping the openings 42 viewed from the proceeding direction of the source light L entering the movable element 30a.

As shown in FIG. 7, apart of the source light L from the light source 2 enters the light-blocking section 41 of the movable element 30a, and is blocked by the light-blocking section 41. Further, a part of the source light L enters the movable element 31a through the openings 42 of the movable element 30a, and is then blocked by the movable element 31a. As described above, since a part of the light corresponding to the light-blocking amount out of the source light L passes through the openings 42, the rise in temperature of the movable element 30a due to the entrance of the source light L can be suppressed compared to the configuration in which, for example, the movable element 30a blocks all of the light to be blocked.

Further, since the movable element 31a blocks the light passed through the openings 42 out of the light corresponding to the light-blocking amount out of the source light L, the rise in temperature of the movable element 31a due to the entrance of the source light L can be suppressed compared to the configuration in which, for example, the movable element 31a blocks all of the light to be blocked. Further, although the movable element 31a rises in temperature due to the entrance of the source light L, since the heat is released from the radiator plates 44, the rise in temperature can dramatically be suppressed.

Since in the projector 1 having such a configuration as described above, the first movable section 30 and the second movable section 31 share the role of blocking the light to be blocked out of the source light L, and the radiator plates 44 release the heat of the light-blocking member 25, the rise in temperature of the light-blocking member 25 can be suppressed. Therefore, the light-blocking member 25 is inhibited from being deteriorated due to the heat caused by the source light L, and thus the life of the projector can be inhibited from being shortened.

It should be noted that as shown in FIG. 3, the light-blocking member 25 is connected to the drive section 26, and a part (e.g., the driven gear 32) of the drive section 26 is made of plastic, and is low in heat resistance in some cases. Even in such cases, since the rise in temperature of the light-blocking member 25 is suppressed, the amount of heat transferred from the light-blocking member 25 to the drive section 26 is decreased, and the harmful influence such as the deterioration of at least a part of the drive section 26 due to the heat can be suppressed. Here, by forming the supporting member 35 and so on shown in FIG. 3 using a material (e.g., stainless steel) lower in thermal conductivity than the light-blocking member 25 (made of, e.g., aluminum), the heat transferred from the light-blocking member 25 to the drive section 26 can further be reduced.

In the present embodiment, the radiator plates 44 are disposed at the positions where the source light L passed through the light-transmitting sections 40 of the first movable section 30 is not input. Therefore, the rise in temperature of the radiator plates 44 due to the direct entrance of the source light L can be suppressed. As a result, the temperature gradient between the light-receiving surface 43 and the radiator plates 44 increases, and thus, it is possible to efficiently release the heat from the radiator plates 44. Further, it is also possible to inhibit the stray light due to the light passed through the openings 42 and then reflected by the radiator plates 44 from occurring. It should be noted that at least a part of the radiator plates 44 can also be disposed at positions where the source light L passed through the light-transmitting sections 40 of the first movable section 30 is input.

In the present embodiment, the radiator plates 44 are disposed on the light-receiving surface 43 of the second movable section 31. Therefore, the space between the movable element 30a and the light-receiving surface 43 of the movable element 31a can be used as the arrangement space for the radiator plates 44, and thus, the dimming device 4 can be made compact.

Figure 8:
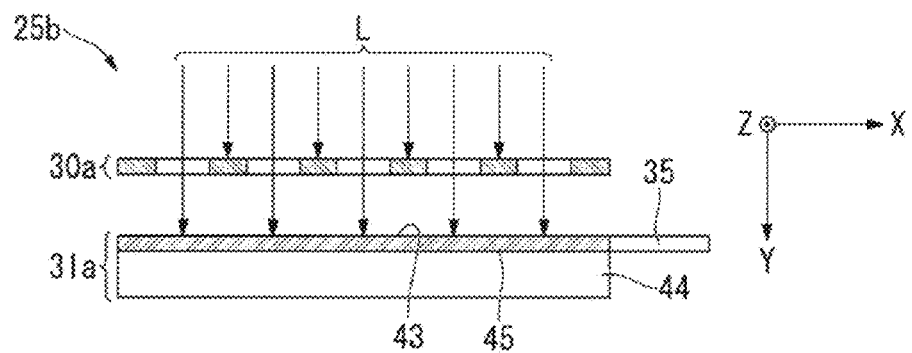
FIG. 8 is a side view showing a light-blocking member according to modified example 1.

Then, modified examples will be explained. FIG. 8 is a side view showing a light-blocking member 25b according to modified example 1. In the light-blocking member 25b shown in FIG. 8, the radiator plates 44 are disposed on a surface 45 facing to an opposite side to the light-receiving surface 43. Therefore, the source light L passed through the openings 42 of the first movable section 30 does not directly enter the radiator plates 44. As a result, the rise in temperature of the radiator plates 44 due to the entrance of the source light L is suppressed, and the heat of the light-blocking member 25b can efficiently be released. It should be noted that the radiator plates 44 can also be disposed on both of the light-receiving surface 43 and the surface 45.

Figure 9:
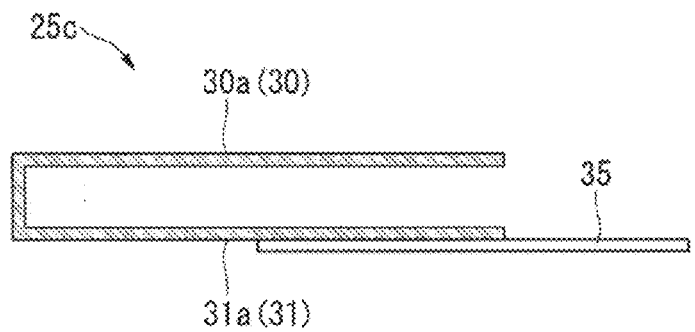
FIG. 9 is a diagram showing a light-blocking member according to modified example 2.

FIG. 9 is a diagram showing a light-blocking member 25c according to modified example 2. The light-blocking member 25c shown in FIG. 9 is a member obtained by integrating the movable element 30a of the first movable section 30 and the movable element 31a of the second movable section 31. The light-blocking member 25c is formed by, for example, bending a plate-like member so as to have a C-shape. According to the light-blocking member 25c, for example, the number of components can be reduced compared to the configuration in which the movable element 30a and the movable element 31a are separate members. It should be noted that the movable element 31a of the second movable section 31 can also be a member separated from the movable element 30a of the first movable section 30, or can be moved independently of the movable element 30a of the first movable section 30.

Figure 10:
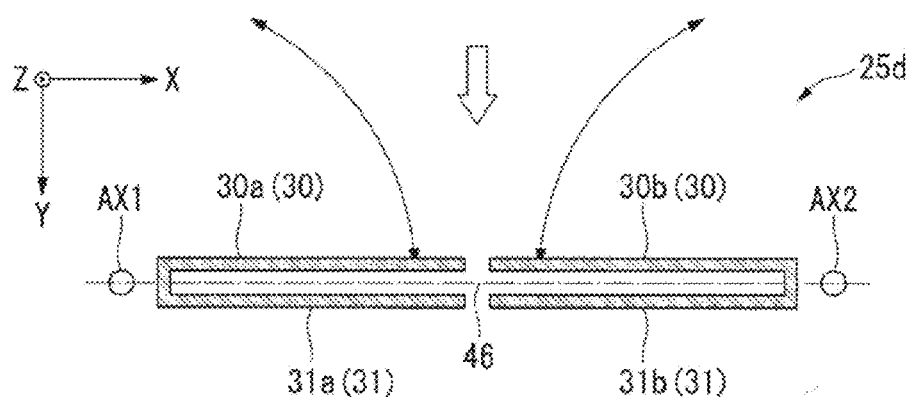
FIG. 10 is a diagram showing a light-blocking member according to modified example 3.

FIG. 10 is a diagram showing a light-blocking member 25d according to modified example 3. Although the light-blocking member 25 shown in FIGS. 2 and 3 has the configuration in which the light-blocking amount varies with the translation thereof, the light-blocking member 25d shown in FIG. 10 has a configuration in which the light-blocking amount varies with the rotation thereof.

In the light-blocking member 25d shown in FIG. 10, the movable element 30a of the first movable section 30 and the movable element 31a of the second movable section 31 rotate around a rotational axis AX1. The movable element 30b of the first movable section 30 and the movable element 31b of the second movable section 31 rotate around a rotational axis AX2. The rotational axis AX1 and the rotational axis AX2 are disposed in, for example, a plane 46 perpendicular to the proceeding direction of the source light L. The light-blocking member 25d is decreased in light-blocking amount as the movable element 30a and the movable element 31a get away from the plane 46. Also in the case of applying such a light-blocking member 25d, the life of the projector 1 can be inhibited from being shortened.

Figure 11:
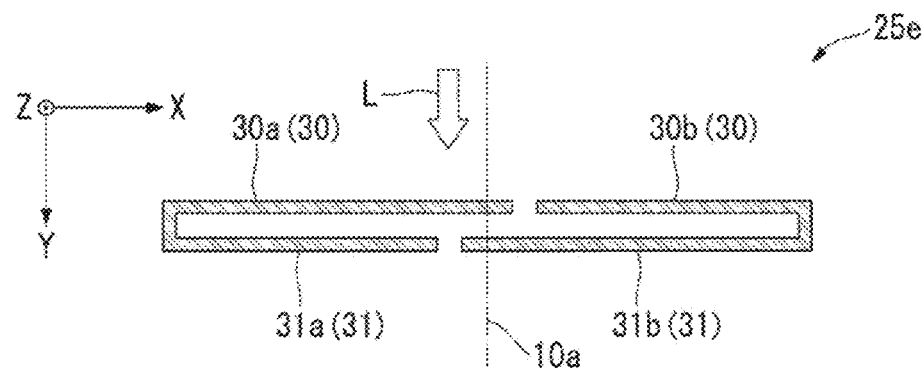
FIG. 11 is a diagram showing a light-blocking member according to modified example 4.

FIG. 11 is a diagram showing a light-blocking member 25e according to modified example 4. In the light-blocking member 25e, the movable element 30a of the first movable section 30 projects toward the movable element 30b of the first movable section 30 compared to the movable element 31a of the movable section 31. Further, the movable element 31b of the second movable section 31 projects toward the movable element 31a of the second movable section 31 compared to the movable element 30b of the first movable section 30. In the light-blocking member 25e, in the state in which the movable element 30a and the movable element 30b of the first movable section 30 are close to each other, the movable element 30a of the first movable section 30 and the movable element 31b of the second movable section 31 overlap each other when viewed from a direction of the optical axis 10a of the uniformizing optical system 10. Therefore, the light-blocking member 25e can block almost all of the source light L while the movable element 30a and the movable element 30b of the first movable section 30 do not have contact with each other.

Figure 12:
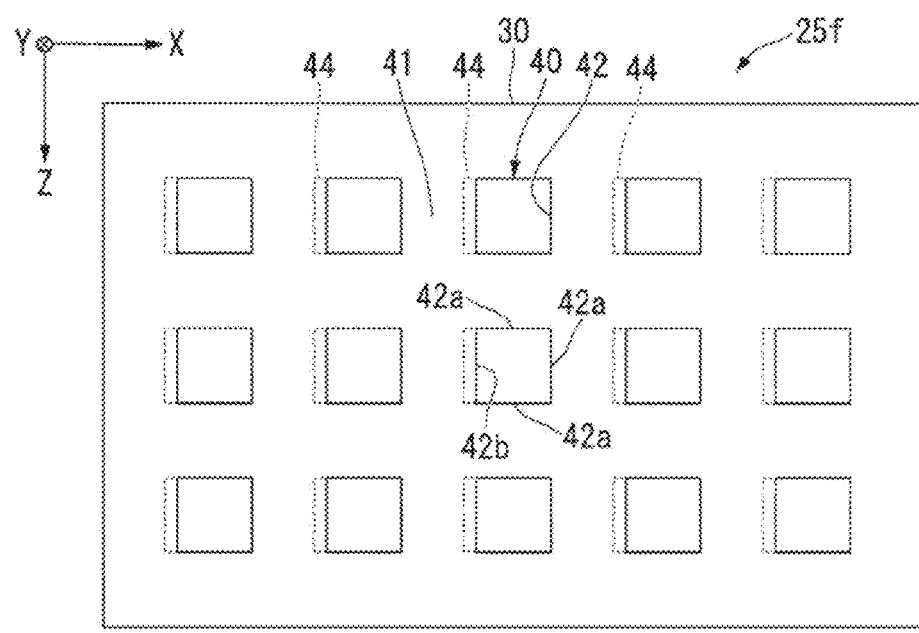
FIG. 12 is a plan view showing a light-blocking member according to modified example 5.
Figure 13:
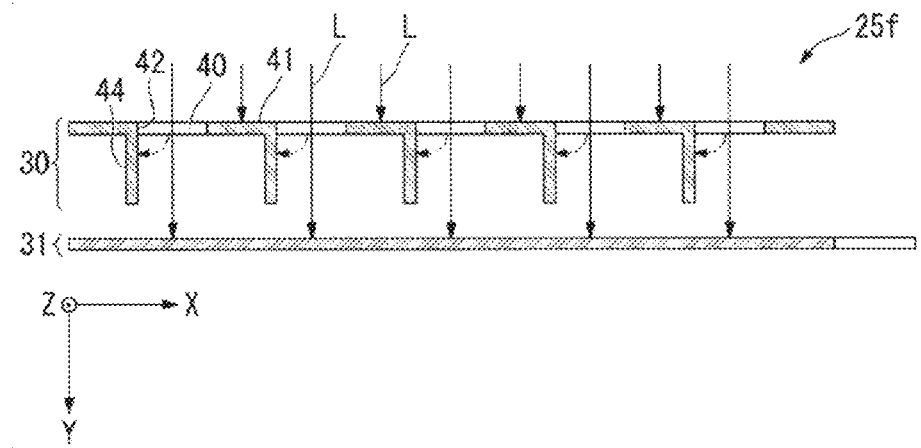
FIG. 13 is a side view showing the light-blocking member according to modified example 5.

FIG. 12 is a plan view showing a light-blocking member 25f according to modified example 5, and FIG. 13 is a side view showing the light-blocking member 25f. In the present modified example, the radiator plates 44 are disposed on the first movable section 30. In the first movable section 30, the radiator plates 44 are formed by cut and bend, and the openings 42 formed by the cut and bend each form at least a part of the light-transmitting section 40.

In a detailed explanation, the light-blocking member 25f is formed using a plate-like member as a base material. The openings 42 shown in FIG. 12 each have a roughly rectangular shape, and are each formed by separating three sides 42a thereof from the plate-like member. As shown in FIG. 13, a part corresponding to the inside of each of the openings 42 of the plate-like member is bent along a side 42b, which is not separated, of each of the openings 42 to form the radiator plate 44. The radiator plates 44 are each bent toward the second movable section 31 to a position where the source light L passed through the openings 42 hardly enters, namely so as to have an angle larger than 90°.

Since in the light-blocking member 25f according to the present modified example, the first movable section 30 and the second movable section 31 share the role of blocking the light to be blocked out of the source light L, and the radiator plates 44 release the heat of the light-blocking member 25f, the rise in temperature of the light-blocking member 25f can be suppressed. Further, since the radiator plates 44 are formed together with the openings 42 by bending, the waste material is reduced compared to the case of forming the openings 42 by punching, and further, the material for forming the radiator plates 44 can be eliminated compared to the case of disposing the radiator plates 44 by bonding.

Figure 14:
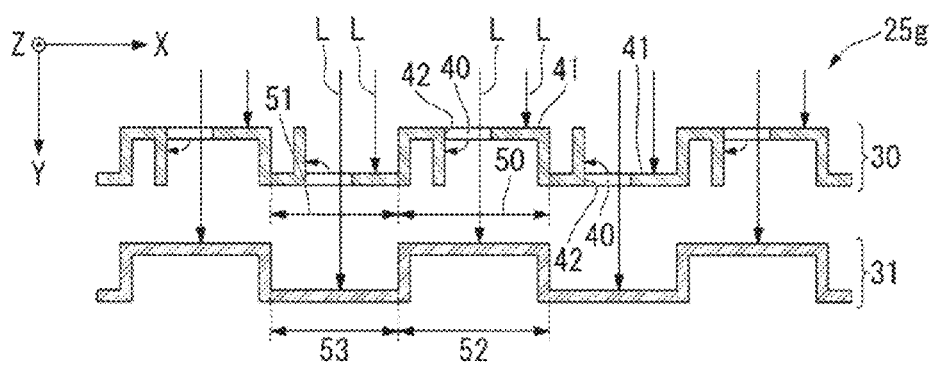
FIG. 14 is a side view showing a light-blocking member according to modified example 6.

FIG. 14 is a side view showing a light-blocking member 25g according to modified example 6. In the light-blocking member 25g, the first movable section 30 is bent to have a concave or convex wave-like shape with respect to the proceeding direction of the source light L. The first movable section 30 shown in FIG. 14 has a rectangular wave shape viewed from a direction intersecting with the proceeding direction of the source light L. The first movable section 30 includes convex sections 50 each convex toward the entrance side of the source light L, and concave sections 51 each concave toward the entrance side of the source light L.

The opening 42 constituting the light-transmitting section 40 is provided to each of the convex sections 50 and the concave sections 51 of the first movable section 30. The openings 42 are each formed by the cut and bend explained in the description of modified example 5. In the convex section 50, the radiator plate 44 is bent from the entrance side toward the exit side of the source light L. Further, in the concave section 51, the radiator plate 44 is bent from the exit side toward the entrance side of the source light L.

The second movable section 31 in the present modified example is bent to have a concave or convex wave-like shape with respect to the proceeding direction of the source light L similarly to the first movable section 30. The second movable section 31 includes convex sections 52 each convex toward the entrance side of the source light L, and concave sections 53 each concave toward the entrance side of the source light L. Here, in the direction perpendicular to the direction in which the source light L enters the light-blocking member 25g, the convex sections 52 of the second movable section 31 are roughly the same in position as the convex sections 50 of the first movable section 30, and the concave sections 53 of the second movable section 31 are roughly the same in position as the concave sections 51 of the first movable section 30. Therefore, the source light L passed through the opening 42 provided to the convex section 50 of the first movable section 30 enters the convex section 52 of the second movable section 31, and the source light L passed through the opening 42 provided to the concave section 51 of the first movable section 30 enters the concave section 53 of the second movable section 31.

In the light-blocking member 25g according to the present modified example, since the first movable section 30 is bent to have a corrugated plate shape, the surface area is increased compared to the case of a planar shape, and it is possible to efficiently release the heat of the first movable section 30. The same also applies to the second movable section 31, and since the second movable section 31 is bent to have a corrugated plate shape, it is possible to efficiently release the heat of the second movable section 31.

Further, the radiator plates 44 are each bent on the exit side of the source light L in the convex sections 50 each convex toward the entrance side of the source light L, and are each bent on the entrance side of the source light L in the concave sections 51 concave toward the entrance side of the source light L. Therefore, it results that at least a part of the radiator plate 44 is housed in a recessed section viewed from the entrance side of the source light L, namely the concave section 51, or a recessed section (the convex section 50) viewed from the exit side of the source light L, and thus, it is possible to miniaturize (reduce the height of) the first movable section 30 in the proceeding direction of the source light L. It should be noted that in the convex sections 50 or the concave sections 51, the radiator plates 44 can be bent toward any of the entrance side and the exit side of the source light L.

It should be noted that in the embodiment and the modified examples described above, the radiator plates 44 can also be provided to either one of the first movable section 30 and the second movable section 31, or both of the first movable section 30 and the second movable section 31.

It should be noted that in the embodiment described above, the light-blocking member 25 of the dimming device 4 is provided to the uniformizing optical system 10, but can also be disposed at the position of an aperture stop or the vicinity thereof. Further, the light-blocking member 25 of the dimming device 4 is disposed on the light path between the fly-eye lens 20 and the fly-eye lens 21 in the uniformizing optical system 10, but can also be disposed at any position on the light path between the light source 2 and the superimposing lens 23. Further, although in the embodiment described above, the uniformizing optical system 10 has the configuration of overlapping the plurality of partial light beams divided into by the fly-eye lens 20, it is also possible to adopt a configuration of uniformizing the illuminance using a rod integrator. In this case, there is provided a relay optical system for making an end surface on the light exit side of the rod integrator and the illumination area (the image forming system 5) optically conjugate with each other, and the light-blocking member 25 of the dimming device 4 can also be disposed on the light path between the light source 2 and an end surface on the light entrance side of the rod integrator, or can also be disposed at a position of the pupil plane of the relay optical system or in the vicinity thereof.

Second Embodiment

Figure 15:
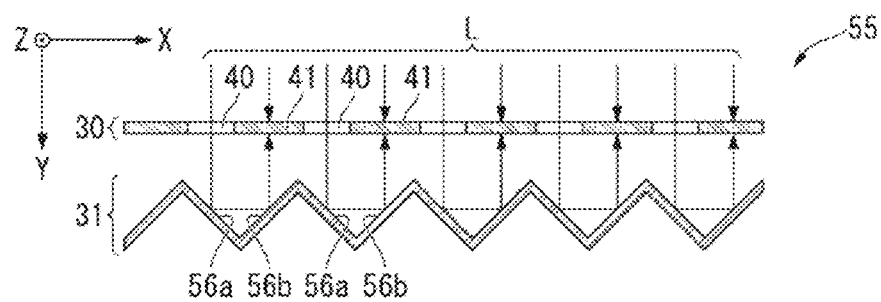
FIG. 15 is a side view showing a light-blocking member according to a second embodiment of the invention.

Then, a second embodiment of the invention will be explained. FIG. 15 is a side view showing a light-blocking member 55 according to the second embodiment. The present embodiment is substantially the same as the projector 1 explained in the description of the first embodiment except a light-blocking member 55, and therefore, the redundant explanation will be omitted.

The light-blocking member 55 shown in FIG. 15 includes the first movable section 30 having the light-transmitting sections 40 and the light-blocking section 41, and the second movable section 31 for blocking the source light L passed through the light-transmitting sections 40. The first movable section 30 has substantially the same configuration as in the first embodiment.

The second movable section 31 has tilted surfaces 56a which the source light L passed through the light-transmitting sections 40 enters. The tilted surfaces 56a are each nonvertical and nonparallel with respect to the proceeding direction of the source light L entering the light-blocking member 55. Apart of the second movable section 31 including each of the tilted surfaces 56a is made of a material having a reflectance with respect to the source light L higher than 0% and lower than 100%, and absorbs a part of the source light L. Further, apart of the source light L passed through the light-transmitting section 40 is reflected by the tilted surface 56a of the second movable section 31.

The second movable section 31 shown in FIG. 15 has tilted surfaces 56b which the source light L having been reflected by corresponding one of the tilted surfaces 56a enters. The tilted surfaces 56b are disposed at positions overlapping the light-blocking section 41 of the first movable section 30 when viewed from the proceeding direction (the direction of the optical axis 10a of the uniformizing optical system 10 shown in FIG. 2) of the source light L entering the light-blocking member 55. The tilted surfaces 56b each form an angle of roughly 90° with corresponding one of the tilted surfaces 56a. Therefore, the part of the source light L passed through the light-transmitting sections 40 of the first movable section 30 is reflected by the tilted surfaces 56a and the tilted surfaces 56b to thereby be reversed in the proceeding direction and shifted in the light path from the state before the incidence to the second movable section 31, and enter the light-blocking section 41 of the first movable section 30.

Incidentally, since a metal material is generally higher in heat resistance than a resin material or the like, the light-blocking member becomes high in heat resistance if the light-blocking member is formed of the metal material. On the other hand, if the light-blocking member is formed of the metal material, it is possible that a part of the source light is reflected by the light-blocking member to become stray light. Such stray light can be returned to the light source to raise the temperature of the light source to thereby deteriorate the light source. Further, it is possible that such stray light enters other members such as a housing to raise the temperature of the members to thereby deteriorate the members.

In the present embodiment, the second movable section 31 guides the part of the source light L passed through the light-transmitting sections 40 to the light-blocking section 41 of the first movable section 30 due to the reflection by the tilted surfaces 56a and the tilted surfaces 56b. Therefore, the part of the source light L passed through the light-transmitting sections 40 is inhibited from becoming the stray light to thereby suppress the deterioration of the light source and the other members due to the stray light. As a result, according to the present embodiment, the life of the projector 1 can be inhibited from being shortened.

Further, since also in the present embodiment, the first movable section 30 and the second movable section 31 are made to share the role of blocking the light to be blocked out of the source light L, the rise in temperature of the light-blocking member 55 can be suppressed to thereby inhibit the life of the projector 1 from being shortened. Further, since the second movable section 31 is bent to have a corrugated plate shape, the surface area is increased compared to the case of a planar shape, and it is possible to efficiently release the heat of the second movable section 31.

Figure 16:
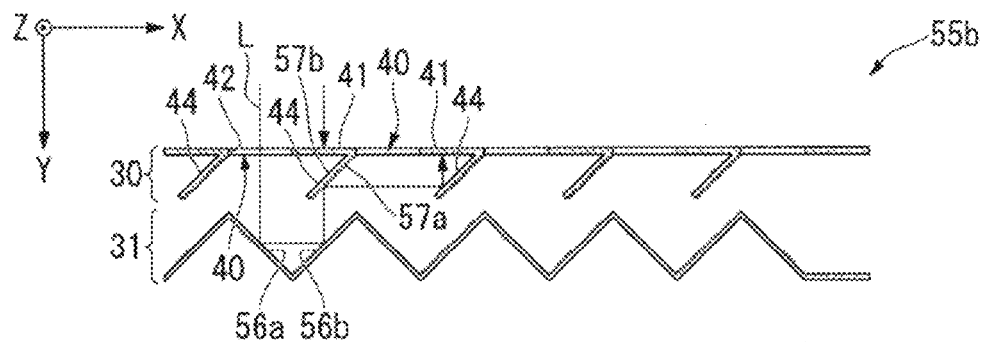
FIG. 16 is a side view showing a light-blocking member according to modified example 7.

Then, a modified example will be explained. FIG. 16 is a side view showing a light-blocking member 55b according to modified example 7. In the present modified example, the first movable section 30 is provided with the radiator plates 44 and the openings FIGS. 42 by the cut and bend as explained with reference to FIGS. 12 through 14.

In the present modified example, the radiator plates 44 are each bent from the position of corresponding one of the openings 42 to have an angle selected from a range larger than 90° and smaller then 180°. The radiator plates 44 each have a first surface 57a, which the source light L having been reflected by the tilted surface 56b of the second movable section 31 enters, and a second surface 57b facing to an opposite side to the first surface 57a. A part of the source light L having entered the first surface 57a from the tilted surface 56b of the second movable section 31 is reflected by the first surface 57a, and thus, the proceeding direction of the source light L is bent, and then the source light enters the second surface 57b of the next radiator plate 44. A part of the source light L having entered the second surface 57b of the next radiator plate 44 is reflected by the second surface 57b, and then enters the light-blocking section 41 of the first movable section 30.

The light-blocking member 55b according to the present embodiment partially absorbs the source light L every time the source light L is reflected by the tilted surfaces 56a, the tilted surfaces 56b of the second movable section 31, the first surfaces 57a, the second surfaces 57b of the radiator plates 44, and so on. Therefore, generation of the stray light is inhibited, and thus, the life of the projector can be inhibited from being shortened.

For example, it is possible that a part of the source light L enters the light-blocking section 41 via the second movable section 31 and the radiator plates 44, and is then folded due to the reflection by the light-blocking section 41 to return to the light source 2 (see FIG. 2). However, the intensity of such return light is reduced by an amount corresponding to the repeated reflection in the light-blocking member 55b compared with the source light L entering the light-blocking member 55b, and the rise in temperature of the light source 2 due to the return light is dramatically suppressed. Therefore, deterioration and so on of the light source 2 is inhibited, and thus, the life of the projector can be inhibited from being shortened.

It should be noted that although in the present embodiment, the second movable section 31 has the configuration of guiding a part of the source light L having entered the second movable section 31 to the light-blocking section 41 of the first movable section 30 due to the reflection by the tilted surface 56a and the tilted surface 56b, there can be adopted a configuration of guiding the part of the source light L to the light-blocking section 41 of the first movable section 30 only by the reflection by the tilted surface 56a. In this case, the tilt of the tilted surface 56a is set based on, for example, the relative position between the tilted surface 56a and the light-blocking section 41, and the distance between the first movable section 30 and the second movable section 31.

It should be noted that although in the present embodiment, the radiator plates 44 are formed by cut and bend, and are continuous with the light-blocking section 41 without a boundary face, it is also possible to adopt a configuration in which other members than the light-blocking section 41 are bonded to the member including the light-blocking section 41. Further, in the light-blocking member 55b, one or more of the surfaces for reflecting the source light L can be mirror surfaces.

Third Embodiment

Then, a third embodiment of the invention will be explained. In the present embodiment, the light-blocking member of the dimming device has a distribution of the light-transmitting sections of the first movable section is a distribution corresponding to the light intensity of the light from the light source 2. The present embodiment is substantially the same as the projector 1 explained in the description of the first embodiment except the light-blocking member, and therefore, the redundant explanation will be omitted.

Figure 17:
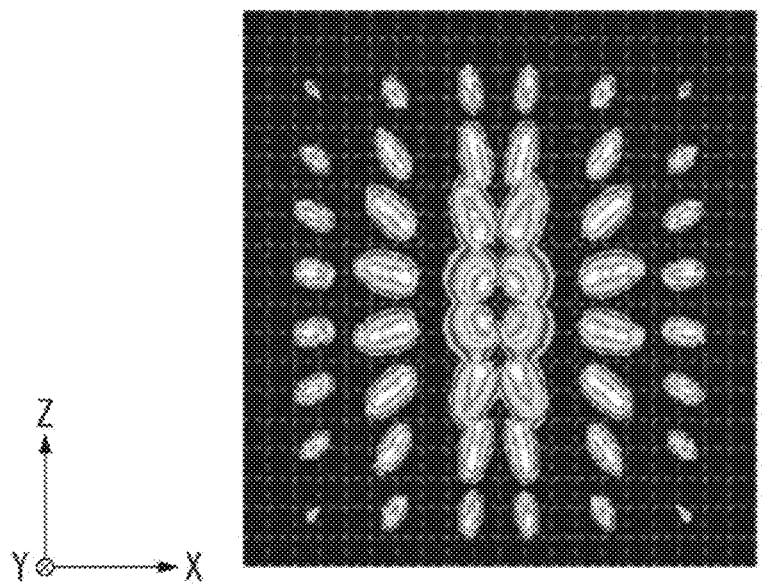
FIG. 17 is a distribution chart showing an example of a light intensity distribution of source light.
Figure 18:
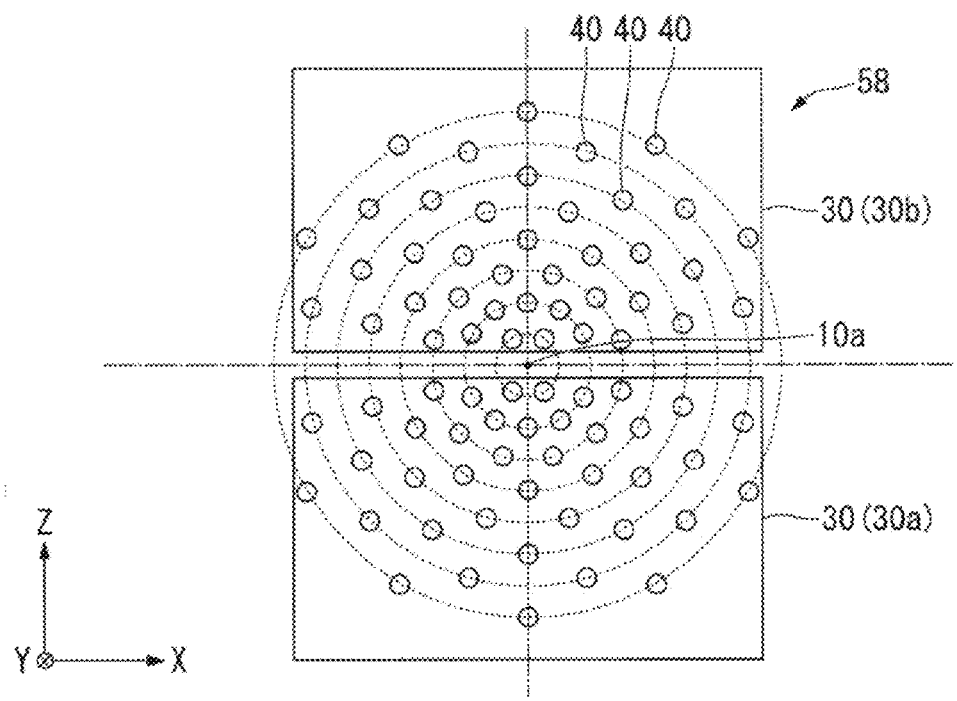
FIG. 18 is a diagram showing a first movable section of a light-blocking member according to a third embodiment of the invention.

FIG. 17 is a distribution chart showing an example of the light intensity distribution of the source light, and FIG. 18 is a diagram showing the first movable section 30 of a light-blocking member 58 according to the present embodiment. The light intensity distribution shown in FIG. 17 corresponds to the pattern of the light source image formed by the fly-eye lens 20 shown in FIG. 2, and corresponds to the light intensity distribution in the vicinity of the fly-eye lens 21. The light-blocking member 58 according to the present embodiment is disposed on the light path between the fly-eye lens 20 and the fly-eye lens 21 similarly to the case shown in FIG. 2, and is translated on a moving plane perpendicular to the optical axis 10a of the uniformizing optical system 10. Therefore, the light intensity distribution in the moving plane of the light-blocking member 58 shows a similar tendency to the light intensity distribution shown in FIG. 17.

The light intensity distribution shown in FIG. 17 has a peak of the light intensity at a position of the light source image formed by each of the lens elements of the fly-eye lens 20. The central position in the distribution chart shown in FIG. 17 is a position corresponding to the optical axis 10a of the uniformizing optical system 10, and in the case in which, for example, the light intensity distribution of the source light emitted from the light source 2 complies with a Gaussian distribution, in general, the closer to the optical axis 10a of the uniformizing optical system 10 the position is, the higher the light intensity on the moving plane of the light-blocking member 58 becomes. For example, if a ring-like microscopic region centered on the optical axis 10a of the uniformizing optical system 10 is set to obtain the value of integral of the light intensity, namely the brightness, in this microscopic region, there is a tendency that the brightness of the microscopic region decreases as the distance (diameter) from the optical axis 10a of the uniformizing optical system 10 to the microscopic region increases.

As shown in FIG. 18, in the light-blocking member 58 according to the present embodiment, in the state in which the light-blocking amount of the dimming device 4 (see FIG. 2) is maximized, the density of the distribution of the light-transmitting sections 40 increases (the aperture ratio of the first movable section 30 increases) in the direction from an area where the light intensity of the source light L from the light source 2 is relatively low to an area where the light intensity thereof is relatively high. It should be noted that the state in which the light-blocking amount of the dimming device 4 is maximized corresponds to the state in which the movable element 30a of the first movable section 30 comes closest to the movable element 30b.

In the first movable section 30 shown in FIG. 18, the light-transmitting sections 40 are arranged on concentric circles (indicated by chain lines in FIG. 18) centered on the optical axis 10a of the uniformizing optical system 10. As explained with reference to FIG. 17, there is a tendency that the light intensity in the moving plane of the first movable section 30 decreases as the distance from the optical axis 10a of the uniformizing optical system 10 increases. In accordance therewith, in the first movable section 30 shown in FIG. 18, focusing attention on the pitch of the light-transmitting sections 40 along the circumferential direction around the optical axis 10a of the uniformizing optical system 10, the pitch of the light-transmitting sections 40 on the circle near to the optical axis 10a of the uniformizing optical system 10 is smaller than the pitch of the light-transmitting sections 40 on the circle far from the optical axis 10a of the uniformizing optical system 10.

Here, the light-transmitting sections 40 are arranged on the circles centered on the optical axis 10a of the uniformizing optical system 10 at predetermined angular intervals (30° in FIG. 18). In this case, the pitches of the light-transmitting sections 40 along the circumferential direction around the optical axis 10a of the uniformizing optical system 10 are determined by the diameters of the respective circles and the predetermined angular intervals described above. Therefore, the more distantly the circle is located from the optical axis 10a of the uniformizing optical system 10, the larger the diameter of the circle is, and therefore, the larger the pitch of the light-transmitting sections 40 becomes.

In the present embodiment, in the area where the light intensity of the source light is relatively high, the distribution of the light-transmitting sections 40 of the first movable section 30 becomes relatively dense, and therefore, the light-blocking amount of the first movable section 30 can be reduced. Therefore, since the local rise in temperature of the first movable section 30 is suppressed to thereby suppress the deterioration of the first movable section 30, the life of the projector 1 can be inhibited from being shortened.

Figure 19:
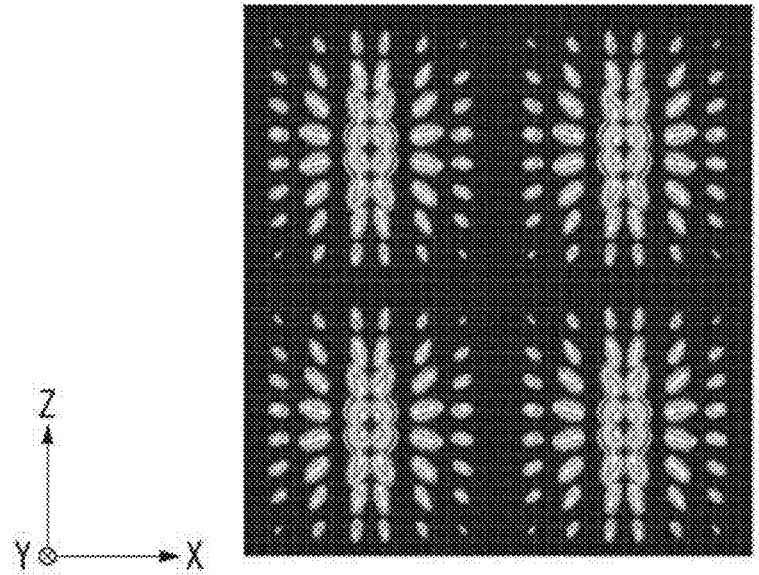
FIG. 19 is a distribution chart showing another example of the light intensity distribution of the source light.

Then, a modified example will be explained. FIG. 19 is a distribution chart showing another example of the light intensity distribution of the source light, and FIG. 20 is a diagram showing the first movable section 30 of a light-blocking member 58b according to modified example 8.

The light intensity distribution shown in FIG. 19 corresponds to the light intensity distribution in the case of, for example, two-dimensionally arranging four light sources in a 2×2 matrix. In such a case, the light intensity distribution due to each of the plurality of light sources is similar to the light intensity distribution shown in FIG. 17, and the total light intensity distribution due to the plurality of light sources becomes a distribution having the light intensity distributions due to the respective light sources arranged in accordance with the arrangement of the light sources.

Figure 20:
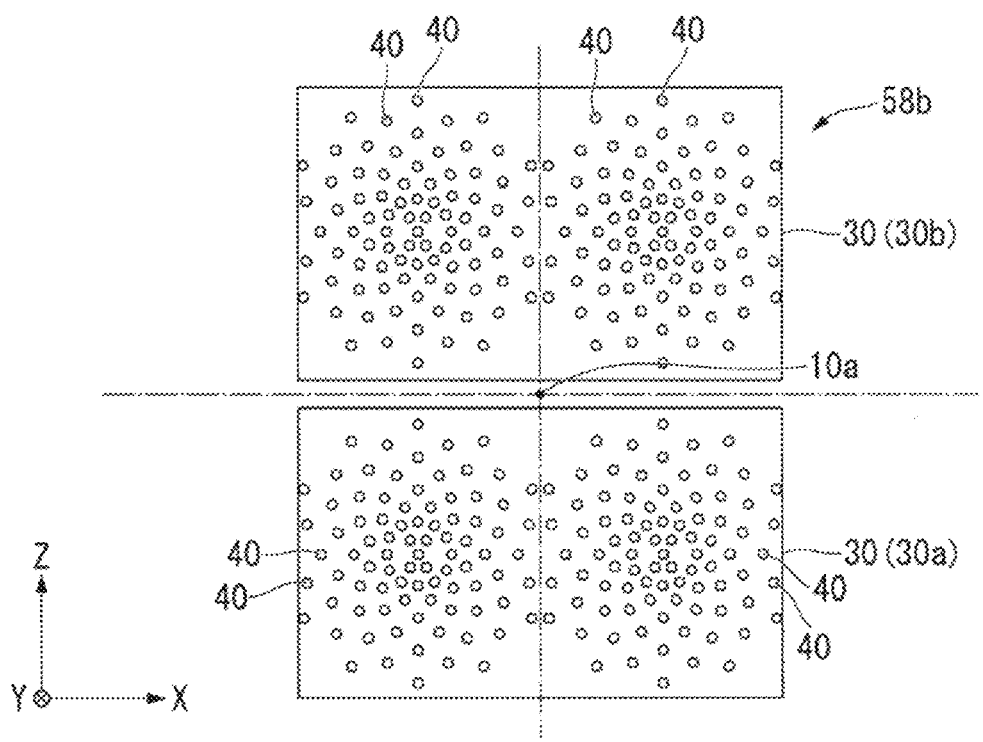
FIG. 20 is a diagram showing a first movable section of a light-blocking member according to modified example 8.

The light-transmitting sections 40 shown in FIG. 20 are arranged in a pattern increasing in density in the direction from the area relatively low in intensity toward the area relatively high in intensity in each of the areas corresponding to the light intensity distributions of the respective light sources. Further, in the whole of the first movable section 30, the light-transmitting sections 40 are arranged in a pattern having the patterns corresponding to the respective light sources arranged in the 2×2 matrix in accordance with the arrangement of the light sources. Also in such a light-blocking member 58b as described above, since the local rise in temperature of the first movable section 30 is suppressed to thereby suppress the deterioration of the first movable section 30, the life of the projector 1 can be inhibited from being shortened.

It should be noted that although in the present embodiment, the pitch of the light-transmitting sections 40 is decreased to thereby increase the density of the distribution of the light-transmitting sections 40 in the direction from the area where the intensity of the light from the light source is relatively low toward the area where the intensity thereof is relatively high, it is also possible that the density of the distribution of the light-transmitting sections 40 is increased by increasing the opening diameters of the light-transmitting sections 40.

It should be noted that the scope of the invention is not limited to the embodiments described above. The constituents explained in the embodiments and the modified examples described above can arbitrarily be combined with each other. Further, one or more of the constituents explained in the embodiments and the modified examples described above can be eliminated.

The entire disclosure of Japanese Patent Application No. 2013-097390, filed May 7, 2013 is expressly incorporated by reference herein.

What is claimed is:

1. A projector comprising:
a light source;
an image forming system adapted to form an image using light from the light source;
a projection system adapted to project the image formed by the image forming system; and
a dimming device including a pair of light-blocking members disposed at positions across a light path between an exit end surface of the projection system and the light source, the pair of light-blocking members being adapted to move in directions getting closer to each other and directions getting away from each other and adapted to control an intensity of the light emitted from the light source,
wherein the pair of light-blocking members includes
a first movable section having at least one light-transmitting section and a light-blocking section, and
a second movable section adapted to block the light passed through the light-transmitting section and to move in a conjunction with the first movable section, and
wherein at least one radiator plate is provided to either one or both of the first movable section and the second movable section.

2. The projector according to claim 1, wherein
the first movable section is provided with the radiator plate formed by cut and bend, and
the light-transmitting section includes an opening formed by the cut and bend.

3. The projector according to claim 1, wherein
in the first movable section, a density of a distribution of the light-transmitting sections increases in a direction from an area where an intensity of the light from the light source is relatively low toward an area where the intensity is relatively high.

4. The projector according to claim 1, wherein
the light-transmitting section includes a plurality of holes formed in the first moveable section.

5. A projector comprising:
a light source;
an image forming system adapted to form an image using light from the light source;
a projection system adapted to project the image formed by the image forming system; and
a dimming device including a light-blocking member adapted to move into and out of a light path between an exit end surface of the projection system and the light source, and adapted to control an intensity of the light emitted from the light source,
wherein the light-blocking member includes
  a first movable section having at least one light-transmitting section and a light-blocking section, and
  a second movable section having a tilted surface at which the light passed through the light-transmitting section enters, and adapted to guide a part of the light passed through the light-transmitting section to the light-blocking section due to reflection by the tilted surface.

6. The projector according to claim 5, wherein
in the first movable section, a density of a distribution of the light-transmitting sections increases in a direction from an area where an intensity of the light from the light source is relatively low toward an area where the intensity is relatively high.

7. A projector comprising:
a light source;
an image forming system adapted to form an image using light from the light source;
a projection system adapted to project the image formed by the image forming system; and
a dimming device including a light-blocking member adapted to move into and out of a light path between an exit end surface of the projection system and the light source, and adapted to control an intensity of the light emitted from the light source,
wherein the light-blocking member includes
  a first movable section having at least one light-transmitting section and a light-blocking section, and
  a second movable section adapted to block the light passed through the light-transmitting section, and
wherein
  at least one radiator plate is provided to either one or both of the first movable section and the second movable section,
  the first movable section is provided with the radiator plate formed by cut and bend,
  the light-transmitting section includes an opening formed by the cut and bend,
  the second movable section has a tilted surface at which the light passed through the light-transmitting section enters, and
  the radiator plate of the first movable section guides the light, which has been reflected by the tilted surface of the second movable section, to the light-blocking section.

8. The projector according to claim 7, wherein
in the first movable section, the at least one light-transmitting section comprises a plurality of light-transmitting sections, and a density of distribution of the light-transmitting sections increases in a direction from an area where an intensity of the light from the light source is relatively low toward an area where the intensity is relatively high.

\* \* \* \* \*